A. F. SYKES.
PRODUCTION OF SOUND RECORDS.
APPLICATION FILED NOV. 16, 1920.

1,428,818.

Patented Sept. 12, 1922.
7 SHEETS—SHEET 1.

A. F. SYKES.
PRODUCTION OF SOUND RECORDS.
APPLICATION FILED NOV. 16, 1920.

1,428,818.
Patented Sept. 12, 1922.
7 SHEETS—SHEET 2.

A. F. SYKES.
PRODUCTION OF SOUND RECORDS.
APPLICATION FILED NOV. 16, 1920.

1,428,818.                                   Patented Sept. 12, 1922.
                                                    7 SHEETS—SHEET 3.

A. F. SYKES.
PRODUCTION OF SOUND RECORDS.
APPLICATION FILED NOV. 16, 1920.

1,428,818.

Patented Sept. 12, 1922.
7 SHEETS—SHEET 4.

A. F. SYKES.
PRODUCTION OF SOUND RECORDS.
APPLICATION FILED NOV. 16, 1920.

1,428,818.

Patented Sept. 12, 1922.
7 SHEETS—SHEET 5.

INVENTOR
A. F. SYKES,
By his Attorneys,

A. F. SYKES.
PRODUCTION OF SOUND RECORDS.
APPLICATION FILED NOV. 16, 1920.

1,428,818.

Patented Sept. 12, 1922.
7 SHEETS—SHEET 7.

INVENTOR
A. F. SYKES,
By his Attorneys,

Baldwin Wight

Patented Sept. 12, 1922.

1,428,818

UNITED STATES PATENT OFFICE.

ADRIAN FRANCIS SYKES, OF NEW BARNET, ENGLAND.

PRODUCTION OF SOUND RECORDS.

Application filed November 16, 1920. Serial No. 424,420.

*To all whom it may concern:*

Be it known that I, ADRIAN FRANCIS SYKES, a subject of the King of Great Britain, residing at Arundel House, Warwick Road, New Barnet, Hertfordshire, England, have invented new and useful Improvements in the Production of Sound Records, of which the following is a specification.

This specification describes a method of recording sound on wax by the simultaneous engraving of two surfaces by the same diaphragm. Thus it is proposed to record between two cylinders, two discs, or between a disc and a cylinder in such manner that as the engraving instrument recedes from one blank surface it engages the other more deeply.

It is an experimental fact that the resistance of the wax to impression by the sound cannot be neglected. In phonograph recording the degree of this resistance varies with the position of the recording tool at the moment and the law of this resistance is far from one of proportionality. This defect it is considered hinders progress at the present time.

It is considered reasonable to assume that the resistance to the motion of the cutter is connected with the area of that portion of the engraving instrument which is engaged. There would appear to be no reason against adopting tentatively the view that the resistance bears a linear relation to the area of the surface in contact with the wax.

It is a feature of vertical recording as contrasted with the lateral system that by the use of a cutting jewel disposed some little distance from the diaphragm in conjunction with a strut capable of taking up the drag resistance, this latter may be made to assist the work that would otherwise fall entirely on the energy of the voice. For this arrangement to be perfect the thrust should increase proportionately to the depth of cut which is by no means the case for a cutter ground to inscribe a circular groove in the wax. Hence if this idea of assisting the diaphragm in its work be considered desirable anything which will render the degree of resistance uniform should make for fidelity of reproduction. For just as the tones of the diaphragm respond to the voice so will they also respond to the superposed influence of the blank resistance, a pure wave will therefore become distorted.

Adopting arbitrary units it can be shown that the immersed area of a circular tool engaged to a depth 1, 2 ... up to 10 varies according to the following table:

| Depth of cut. | Immersed area. | Depth of cut. | Immersed area. |
|---|---|---|---|
| 0 | 0 | 6 | 61 |
| 1 | 4 | 7 | 77 |
| 2 | 12 | 8 | 94 |
| 3 | 22 | 9 | 112 |
| 4 | 34 | 10 | 131 |
| 5 | 47 | | |

With such a curve it is quite evident that the quality of the tones recorded must be influenced seriously if the magnitude of the resistance is appreciable; for of course, all kinds of subsidiary effects may be present without detriment to the result provided their proportions are relatively small.

So much for the single cutter, which of course only makes one impression. When two surfaces are engaged simultaneously so that as one cutting edge recedes the other engages the wax more deeply the conditions are totally different and present features of remarkable interest. The sum and difference of the areas immersed is now involved.

Denoting the cutters respectively as A and B, we can construct the following table showing the immersed areas of

| Cutter A. | Cutter B. | A+B | A−B |
|---|---|---|---|
| 47 | 47 | 94 | 0 |
| 61 | 34 | 95 | 27 |
| 77 | 22 | 99 | 55 |
| 94 | 12 | 106 | 82 |
| 112 | 4 | 116 | 108 |
| 131 | 0 | 131 | 131 | the sum of the depths of cut of the two cutters being 10 (see preceding table).

Comparing these results with those for the single cutter we see that the maximum amount of wax being removed at any instant has not been increased; that the variation of the total amount of wax being removed has been very greatly reduced; that to the extent it is desired the drag resistance should assist or resist the vibration of the diaphragm such assistance or resistance is of a proportionate character and is not in itself likely to distort the recorded sound. Furthermore the diaphragm can be perfectly neutral, that is neither bent in nor out, and the behaviour of the apparatus is symmetrical. The fact that the total amount of wax being removed is not nearly so variable as hitherto has some bearing on the constancy of the conditions governing the frictional damping of the diaphragm. Of course for small vibrations compared with the total range there may be no appreciable difference; but it is precisely because the full range is utilized in practice that benefit is to be expected. Experience indicates that as the loudness of the sound increases so does the amount of noise and falsity extend. Practically then it is proposed to record between two surfaces—to make in fact two records; and thus the louder tones will suffer less distortion.

My invention is illustrated by the accompanying drawings;—

Figures 4ª and 4ᵇ show sections of two types of sound box for engraving two cylinders.

Figure 10 shows a similar arrangement.

Figure 1:
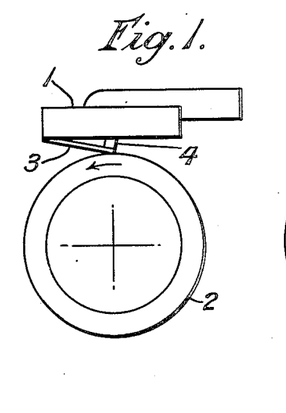
Figure 1 is a side elevation for purposes of comparison of an ordinary recording sound box and a rotating wax cylinder.

Figure 1 shows an ordinary recording sound box (1) engaged with a rotating wax cylinder (2) for the purpose of registering sound. A cutting jewel is cemented to the end of the strut (3) which strut takes up the drag force incidental to the production of the shaving from the cylinder. This strut (3) is connected with the diaphragm of the sound box by a light piece of metal (4). But for the strut (3) it would be difficult to avoid a continuous chatter of the recording jewel.

Figure 2:
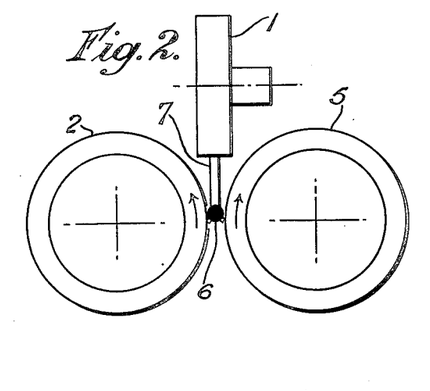
Figure 2 is a side elevation of a sound box recording between two cylinders.

Figure 2 indicates diagrammatically the system applied according to my invention. The double engraving device (6), which in this case consists of two similar Edison type recording sapphires set at the same angle and mounted on the end of the sound box lever (7), is located between the blank cylinders (2 and 5). For simplicity a lever type sound box is represented although such sound boxes are not usually favoured by exponents of the vertical system.

Figure 3:
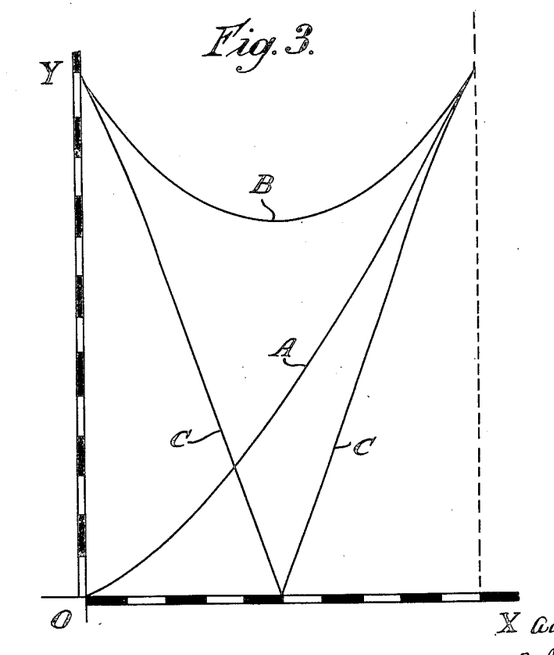
Figure 3 is a diagram dealing with the sectional area of the shavings removed in recording.

In Figure 3 is set out graphically the relation between the depth of cut OX and the area OY of the tool or tools in contact with the wax. Curve A illustrates the variation with the depth of cut in the amount of wax removed by the normal type of recorder as in Figure 1.

Curve B represents the state of affairs corresponding to the invention as in Figure 2. It will be noticed that the variation in the total amount of wax removed for the full range is very much less for curve B than for curve A. Curve C shows how the areas immersed in the case of apparatus in Figure 1 affects any outstanding element of control there may be corresponding to either the horizontal or vertical component of the drag resistance; the extremely important feature of this is that the relation is substantially linear, that is the resistance toward or away from the mean position of the diaphragm is proportional to the displacement therefrom—a very different state of affairs from that occurring with the usual practice. The variation in area for curve A is from 0 to 131 and in curve B from 94 to 131 and in this case it is equally distributed on either side of the mean position. The curves are calculated mathematically for a jewel or pair of jewels adapted for cutting a circular track and presenting a cutting face normal to the surface being engraved. The diameter of the engraving jewels is 0.025 cm. and the maximum depth of cut is 0.000159 cm.—a depth just sufficing to allow the maximum width of cut without interfering with the adjacent thread on a record engraved with 200 threads to the inch. Thus from 0 to the dotted line OX is 0.00159 cm. divided into 10 equal parts; while vertically along OY the maximum area graphed is 0.0000131 sq. cm. To avoid plotting negative values curve C has been turned up where it cuts OX; it is therefore to be understood that this curve is one of predominance of area; it also represents outstanding reaction on the diaphragm always toward or away from its mean position, as the case may be. Thus the arrangement shown in Figure 2 can only be stable with a sufficiently stiff diaphgram because the influence of the drag resistance increases on either side of the neutral position and acts so as to deflect further the diaphragm. Whether the drag resistance is used to assist or diminish the elastic resistance of the diaphragm is a matter for the discretion of the recording expert. As will be seen later it depends on the setting of the jewels relative to the lever.

Figure 4:
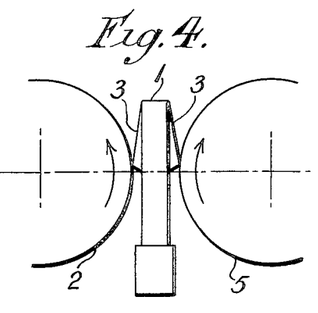
Figure 4 is a side elevation of a sound box of the direct contact type, (as opposed to a lever sound box), located between two cylinders.
Figures 4A, 4B:
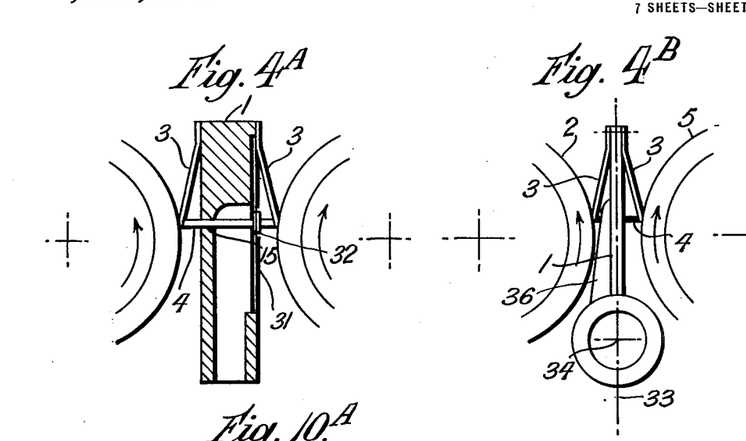

Figures 4 and 4$^a$ represent the use of a sound box (1) on the lines favoured by phonograph recorders; there is no pivoted lever, the action being direct. The normal practice is modified to the extent that there are two light struts (3) one on either side of the diaphragm. This is rendered possible by piercing the shell of the sound box and coupling up the two struts (3) and the diaphragm 31 by means of a light tube or rod 4. The shell is pierced at 15 and to permit the struts to vibrate without friction the usual clearance allowed between the shell and the coupling rod is filled in with vaseline. To avoid piercing the diaphragm the coupling rod may be made in two parts with bearing pads 32 cemented to the diaphragm.

Figure 4$^B$ is an illustration of a sound box very similar to that of Figure 4$^A$ but attention is paid to shortening the distance between the cutters and to the symmetrical location of the diaphragm with respect to the surfaces to be engraved. In operation the sound box is free to rise and fall along the centre line 33 and to rotate about the axis 34; it moreover is balanced about this axis as in Figure 13. There is a downward force due to the weight of the sound box and its attachments modified by a counterbalance weight and an upward force due to the shavings; these forces are in equilibrium. Automatic adjustment for average equality in the thickness of the shavings is achieved by the swivel action about the axis 34.

Figure 5:
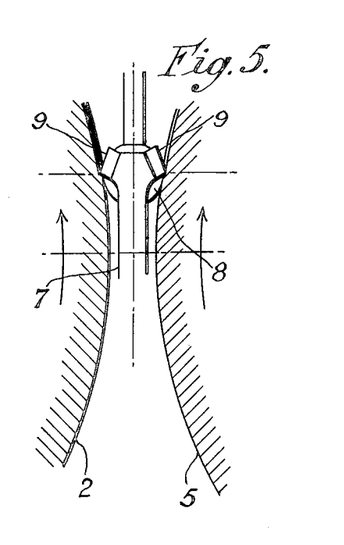
Figure 5 is a local view in part section showing a positive method for determining the depth of cut in the wax.

In Figure 5 a smooth ball (8) is attached to the recording apparatus and so determines the position relative to the cylinders (2 and 5). The ball can as described below be raised or lowered with respect to the cutter for adjustment, the setting for depth of cut is thus positive but the adjustment to any slight wobble in the rotation of the cylinders is automatic. The recording jewels (9) are fixed to the lever of a sound box—itself not depicted. Such a disposition of the jewels in relation to the lever gives stability regardless of the stiffness of the diaphragm.

Figure 6:
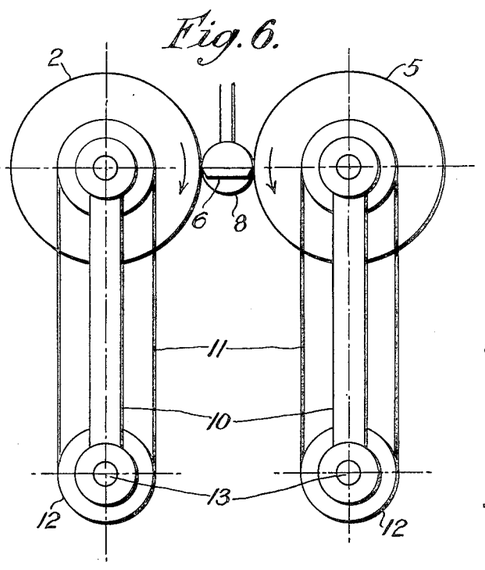
Figure 6 is a side elevation of another positive method for determining the depth of cut in the wax.

In Figure 6 the stationary position of the recording sound box is the chief consideration. The cylinders (2 and 5) are free to rock or wobble owing to chance irregularity of surface against a fixed smooth ball (8) which determines the distance between them and so the depth of the shavings taken off by the double cutter (9). No sound box is shown for the sake of clearness and it is to be understood that the cutter 6 may be vibrated by means similar to those described for the other figures. Either the ball (8) can be adjustable so that the relative thickness of the two shavings can be determined positively or the adjustment may be automatic if the necessary degree of freedom be given to the sound box. The cylinders are mounted on frame work (10) and belts (11) provide the means for rotating the cylinders from the pulleys (12) which pulleys are driven by some suitable agency such as an electric motor. The frames (10) are free to rock about the axes (13) and so press on the ball or distance piece (8).

Figure 7:
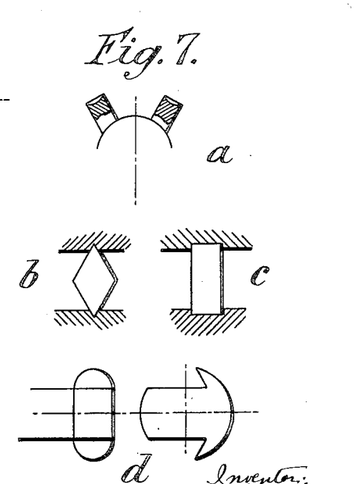
Figure 7 shows examples of cutters.

Figure 7 shows some examples of cutters. Thus at (*a*) is represented two Bettini hollow ground sapphires set in a small ball of shellac which would be attached to the lever of a sound box. At (*b*) is a double V-shaped cutter. At (*c*) is shown a rectangular cutter, which it is interesting to note gives absolute constancy to the total amount of wax being removed and at (*d*) are shown two views of a double cutter ground in a single jewel.

Figure 8:
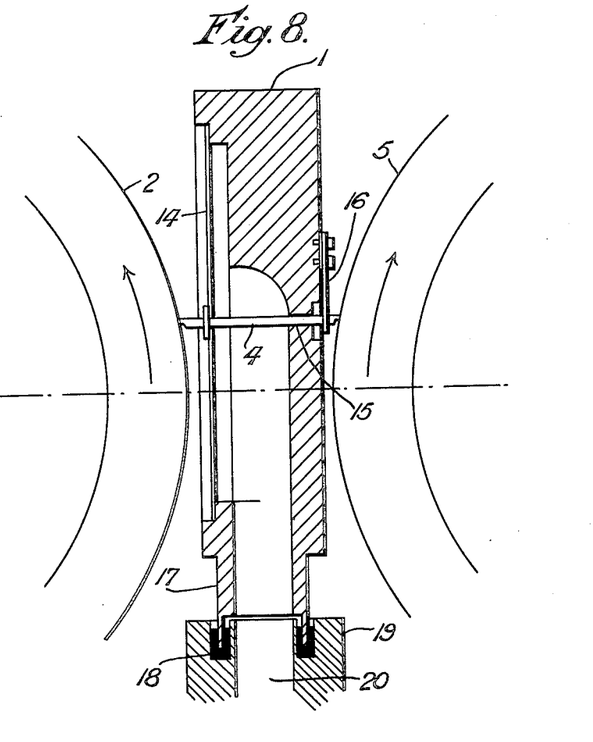
Figure 8 is a sectional view of a recording sound box of the direct contact type adapted to the purposes of the invention.

An enlarged view of a double cutter sound box is shown in Figure 8. Here the sound box (1) is located between the cylinders (2 and 5). Attached to the diaphragm (14) is a light rod (4) which passes through the hole (15) and is elastically supported by the reed (16). Cutting jewels are cemented to the ends of rod (4). The entrance (17) to the sound box dips into the annular channel of mercury (18) for the purpose of securing a sound tight joint of great flexibility. The sound box is supported so as to be quite free to move sideways to provide automatic adjustment to the wax surfaces and it is also free to move vertically, the magnitude of the cut being determined by gravity; a mechanical arrangement adapted to this end is illustrated in Figure 11.

Figure 9:
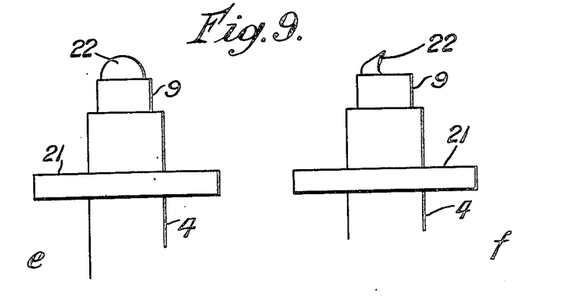
Figure 9 represents two views at right angles of a cutter applicable to the apparatus of Figure 8.

Figure 9 shows two views (e and f) to an enlarged scale of the end of the rod (4) of Figure 8. The rod (4) has a flange (21) for attachment to the diaphragm and jewels (9) cemented into the ends. The end (22) of the jewel (9) is ground to form the engraving edge—in this case the angle is set back to realize the effect of the Bettini cutter.

Figure 10:
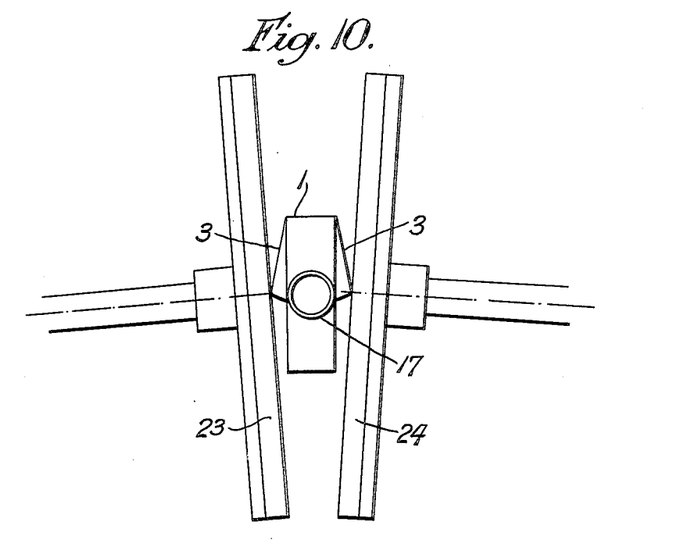
Figure 10 is a view of two disc blanks inclined at a small angle and a sound box engraving each simultaneously.
Figure 10A:
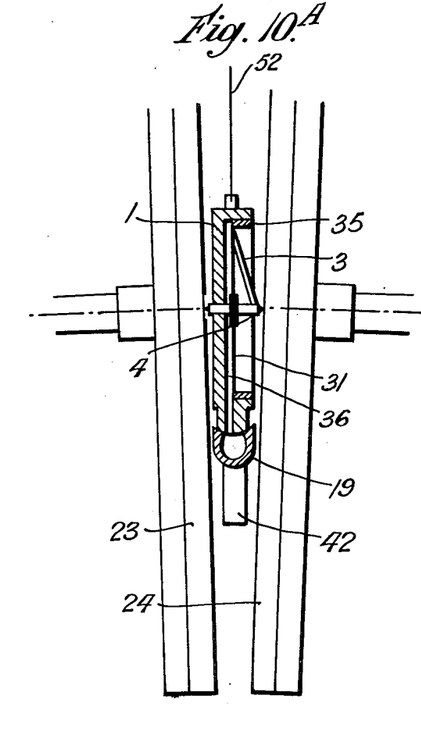

In Figure 10 a sound box (1) is shown between two discs (23 and 24). The sound box is arranged for gravity adjustment and is simply floated on the two surfaces which are set at a small angle to render this possible. The adaptations already described for cylinders can be substituted. Figure 10$^A$ shows a somewhat similar arrangement. The sound box 1 is swivelled on the sound conduit 19 in trunnion fashion; that is to say, the rotation really occurs on pivot points and there is no contact between the adjacent surfaces except through a film of oil or vaseline. Only one strut is used in this design. Two very light tubes 4 which are cemented one on either side of the diaphragm constitute the coupling rod. Sound acts on the diaphragm via the channel 36 which is very broad in proportion to its width. A further feature of the design is that the diaphragm 31 is mounted on a ring 35 so that the whole engraving appliance can be removed quickly and replaced by one comprising a different diaphragm. Until the recording is ready to commence the gear is kept free of the wax by the ligament 52, which is a cord or equivalent means by which the sound box may be suspended and lowered into position as desired.

Figure 11:
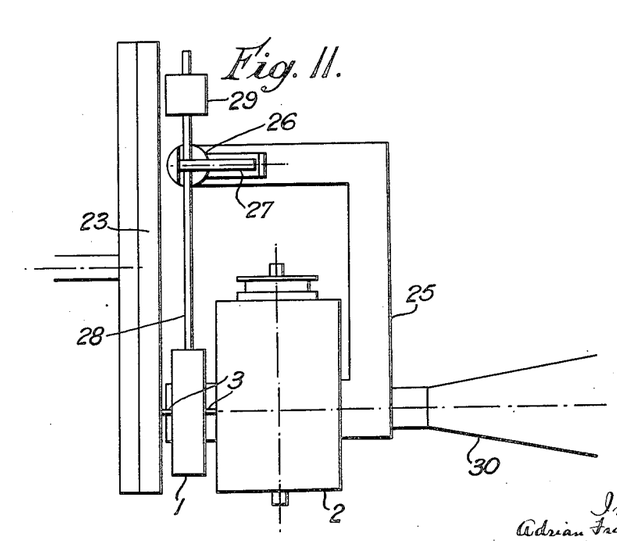
Figure 11 is a plan from above of apparatus suitable for the simultaneous production of a disc and a cylinder record.

Figure 11 represents apparatus for simultaneously engraving a disc (23) and a cylinder (2). A feed carriage (25) is provided with a small turntable (26) which in turn supports at both ends the pivoted rod or trunnion (27) to which rod is secured another rod (28) one end of which carries a balance weight (29) and the other the sound box (1). The sound box is free to move up or down and also sideways but is otherwise constrained by the feed carriage, and is thus able to adjust itself to the wax surfaces and by varying the position of the balance weight the depth of cut can be altered. The entrance to the sound box which is underneath dips into a mercury channel and so connects the sound box to the sound channel as already described in connection with Figure 8.

Figure 12:
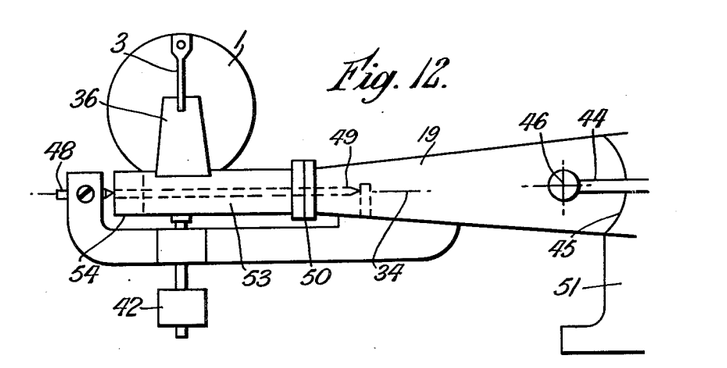
Figure 12 shows how a sound box may be mounted and operated.

Figure 12 shows how a sound box may be mounted and operated. The recording sound box which is swivelled and counterbalanced about the axis 34 is similar to that illustrated in Figure 4$^B$. It comprises a shell 1, a sound duct 36 and tube 33 closed at 54 and in communication with the sound conduit or tone arm 19. In this particular design the rotational freedom is secured by an external pivot 48 and an internal pivot 49 as indicated by dotted lines; the apparatus is made with precision and the sliding joint 50 is smeared with vaseline. Instead of feeding the sound box and its attachments which is constrained by a racket 51 the cylinders are traversed. If the records are to be masters in duplicate, it is necessary to traverse the cylinders in opposite directions otherwise one will be a left hand thread and not reproducible on a standard phonograph.

Figure 13:
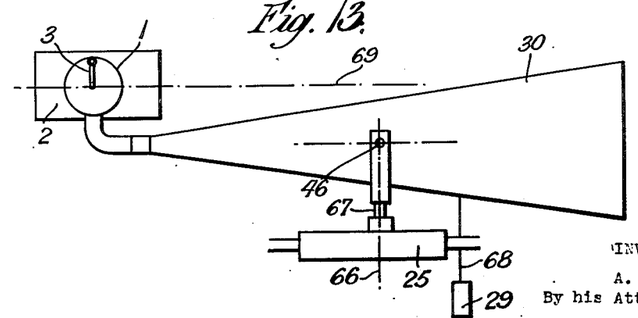
Figure 13 illustrates the general arrangement for mounting a sound box to float between two surfaces.

Figure 13 illustrates the general arrangement necessary for floating a sound box between two surfaces with gravity control for depth of cut. A horn 30 is mounted on a pair of pivots on the axis 46 and this axis of pivoting 46 is freely rotatable about the axis 66, that is to say, the pin 67 is sunk in a hole in the feed carriage 25; it follows that the sound box is free to move up and down and also sideways but is otherwise constrained by the feed carriage; hence the sound box is free to adjust itself to the wax surfaces. The depth of cut is regulated by altering the weight 29 hung on the ligament 68 or by equivalent means.

Figure 14:
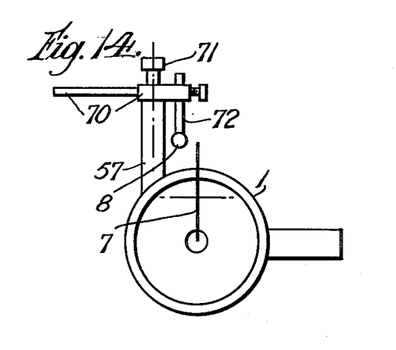
Figure 14 shows a sound box equipped with a distance ball as in Figure 5.

Figure 14 is a diagram of a sound box equipped with ball distance regulator as in Figure 5. To the shell 1 of the sound box is fixed a rectangular extension 57 which carries a lever 70 with clamping screw 71. The lever 70 supports the ball 8 and the vertical position of the latter can be regulated as shown by sliding the stem 72 in the hole in the lever 71 and fixing with set screw. Obviously it would be better to substitute micrometer slides to give the desired adjustment. It is to be understood that this sound box is floated on the ball between the two surfaces by the same mechanical suspension as in the preceding figure, and if the sound box is electro-magnetically operated the same holds good only that a rod takes the place of the horn.

What I claim is:—

1. In means for producing sound records, the combination of a cutting tool adapted to cut two blanks simultaneously and means for actuating the tool in accordance with sound waves.

2. In means for producing sound records, the combination of a cutting tool adapted to cut two blanks simultaneously so that as it recedes from one blank it cuts the other more deeply, and means for actuating the tool in accordance with sound waves.

3. In means for producing sound records, the combination of a cutting tool adapted to cut a cylindrical blank and a disc blank simultaneously and means for actuating the tool in accordance with sound waves.

4. In means for producing sound records, the combination of a sound box, a diaphragm therein, a rod attached to the diaphragm, and cutters carried by the rod and adapted to cut two blanks simultaneously.

5. In means for producing sound records, the combination of a cutting tool adapted to cut two blanks simultaneously, means for actuating the tool in accordance with sound waves, and a smooth distance piece adapted to contact with both blanks.

In testimony that I claim the foregoing as my invention I have signed my name this 28th day of October, 1920.

ADRIAN FRANCIS SYKES.